United States Patent [19]

Ziese, Jr.

[11] Patent Number: 4,667,430
[45] Date of Patent: May 26, 1987

[54] CAPILLARY FEED LURE DISPENSING APPARATUS

[75] Inventor: William J. Ziese, Jr., Johnstown, N.Y.

[73] Assignee: Pete Rickard, Inc., Cobleskill, N.Y.

[21] Appl. No.: 863,211

[22] Filed: May 14, 1986

[51] Int. Cl.⁴ .............................................. A01M 31/06
[52] U.S. Cl. ............................................ 43/1; 119/29; 239/51; 239/145; 239/302
[58] Field of Search .................... 43/1, 132.1; 239/302, 239/379, 145, 51; 222/181, 185; 119/29, 156, 1

[56] References Cited

U.S. PATENT DOCUMENTS

| 916,143 | 3/1909 | Gaus | 239/51 |
| 1,240,831 | 9/1917 | Doering | 239/51 |
| 3,046,192 | 7/1962 | Bilyeu | 43/1 |
| 3,134,515 | 5/1964 | Callahan | 222/527 |
| 3,938,769 | 2/1976 | Wetherbee | 222/181 |

FOREIGN PATENT DOCUMENTS 818791 10/1937 France ............................... 239/302

Primary Examiner—Gene P. Crosby
Attorney, Agent, or Firm—Henderson & Sturm

[57] ABSTRACT

The present disclosure relates to a buck lure dispensing apparatus (10) wherein the apparatus (10) has a receptacle member (14) having a capillary feed tube (25) extending from within the fluid reservoir (16) to a point beneath the fluid reservoir (16). A conformable receptacle holder unit (13) has a tubular length of netting (28) wherein the interstices in the netting (28) are dimensioned to accept the capillary feed tube (25) for the purpose of positioning the outlet (25") of the feed tube relative to the receptacle member (14).

7 Claims, 5 Drawing Figures

U.S. Patent  May 26, 1987  4,667,430
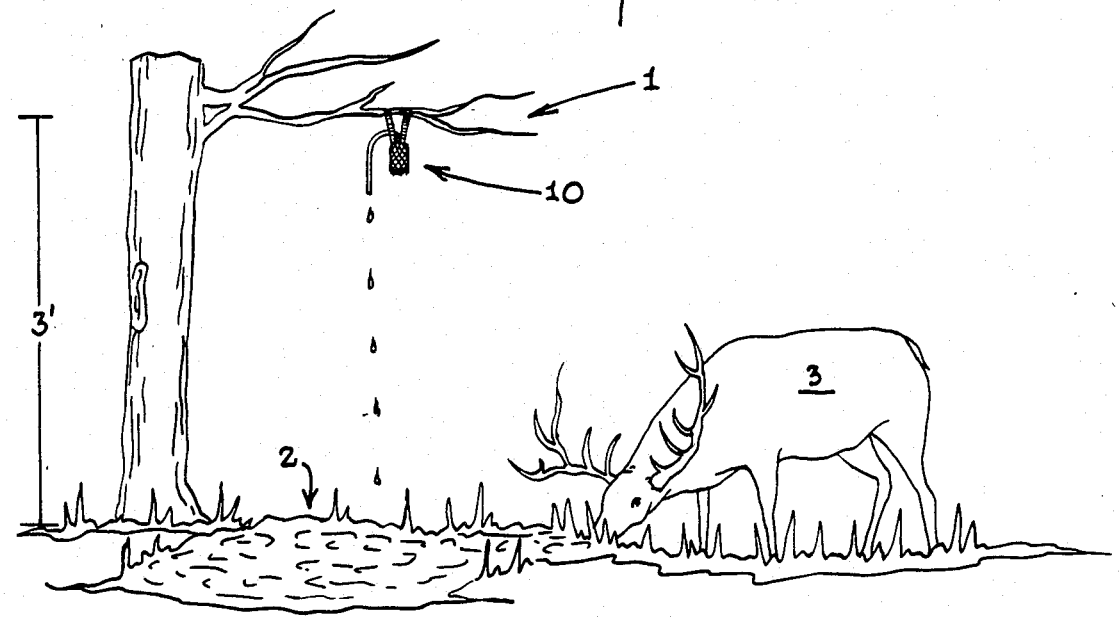
FIG.1.
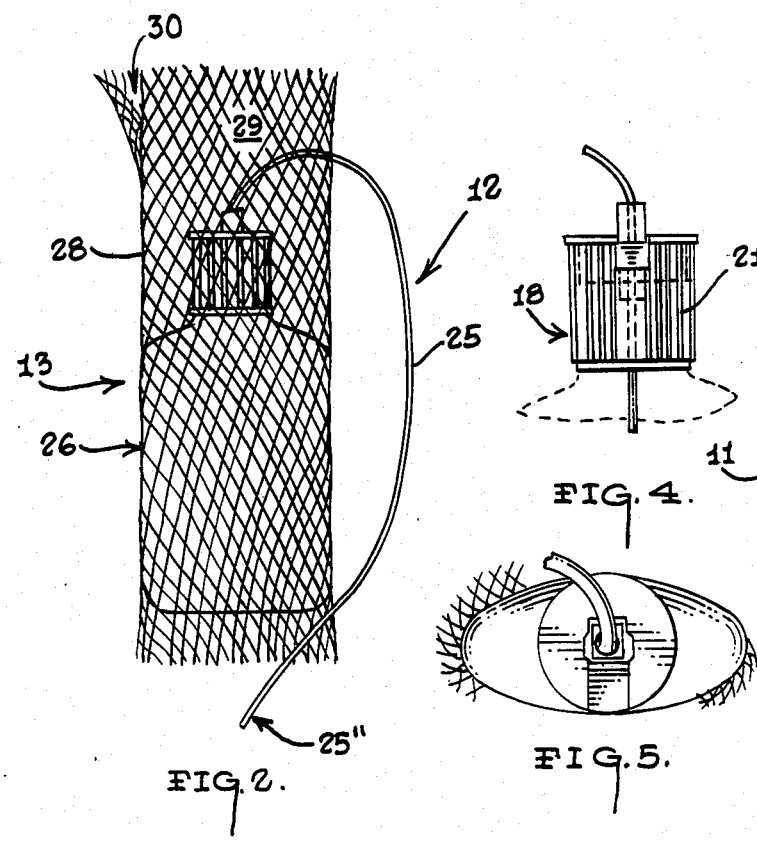
FIG.2.
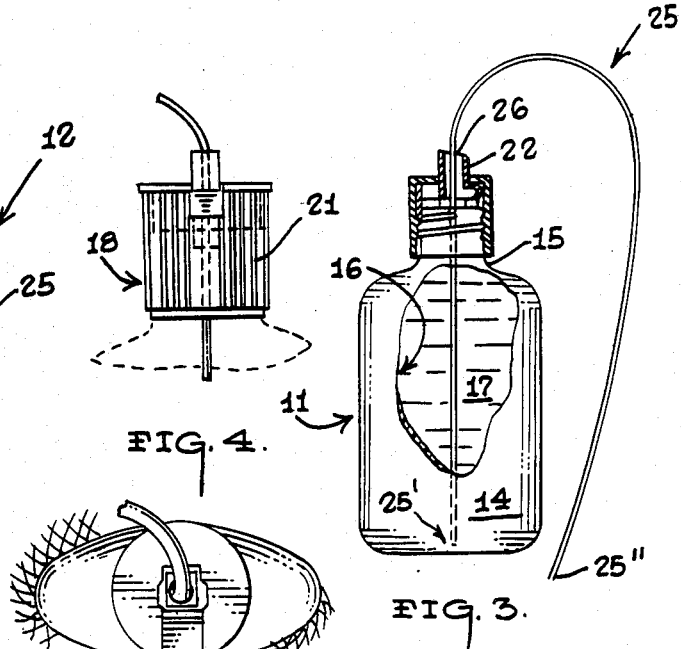
FIG.4.
FIG.3.
FIG.5.

CAPILLARY FEED LURE DISPENSING APPARATUS

TECHNICAL FIELD

The present invention relates generally to liquid dispensers for animal lures.

BACKGROUND OF THE INVENTION

A fact that trappers have known for years, and which present day hunters are just becoming to fully appreciate, is that wild animals as a whole will rely more heavily for their survival upon their sense of smell, than all of their other senses combined.

Wild animals use their noses for three very important reasons: food, sex, and survival. With respect to food, the animal will rely upon its sense of smell to locate and identify edible substances. With respect to sex, animals use their sense of smell to detect scent marked territories of competing males; as well as, to track females in heat and identify the receptive females among groups of females. With respect to survival, animals use their sense of smell to alert them to the presence of man, manmade objects such as traps, and natural dangers such as fire.

Obviously if a hunter or trapper desires to overcome the animal's highly developed sense of smell, they must either nullify the animal's advantage, or use that advantage against the animal. In the first instance, masking lures were developed to negate the odor of man and/or manmade objects in the animal's natural environment. In the second instance, aromatic food scents and sex scents were developed to lure animals to the source of the particular aroma producing compound.

The whitetail deer is this country's premier game animal in terms of money spent and man hours expended during the hunting season. In addition, the whitetail deer possesses character traits that make this species particularly susceptible to the use of lures, masking scents and attractants.

To begin with, whitetail deer unlike other species such as mule deer, elk, moose, etc. are considered to be very territorial and somewhat predictable relative to their daily activity patterns (e.g. whitetail deer will feed and bed down in the same general area for extended periods of time).

In addition, when it comes to mating, whitetail bucks become very predictable in their daily patterns and activity. Whitetail bucks create two different types of "scrapes", one of which is a territorial scrape and the other of which is a mating scrape, and on occasion a territorial scrape will serve both purposes.

Essentially a "scrape" consists of a generally circular area on the ground that has been cleared of all leaves and debris by a buck pawing or scraping the area clean with his hooves.

While territorial scrapes are maintained year round, mating scrapes appear only during the breeding season and can be distinguished from territorial scrapes on the following basis. An active mating scrape will always be clear of debris and exhibit signs of recent pawing. A mating scrape will also bear evidence of recent urination either through odor or discoloration of the soil; and, in most areas a mating scrape will be positioned beneath an overhanging branch whose ends exhibit signs of chewing by the buck who is maintaining the scrape.

As a result of the foregoing situation "scrape hunting" (i.e. hunting in the vicinity of an "active" scrape) has become recognized as an extremely effective strategy for bagging whitetail bucks. In addition, variations of the scrape hunting technique have been developed to increase the hunter's chances of bagging the "dominant" buck in a given territorial area.

When a hunter finds an "active" scrape in the woods, all that he or she can be certain of, is that one of the sexually mature bucks in the area will be visiting that particular scrape on a regular basis, and this buck may or may not be a dominant buck.

In the absence, or in lieu, of finding an active scrape, the hunter now has another technique available to him; in that, he can create a "mock" scrape by imitating a buck's actions in clearing an area in an appropriate location and depositing commercially obtained urine from a doe in heat on the scrape.

In addition, for added realism the hunter may also add urine from a buck to create the sensory illusion that a strange buck has entered a dominant buck's territory, established a breeding scrape, and has had at least one receptive doe visit the scrape and indicated her willingness to be bred.

Given the cost of the commercially available sex lures, it is impractical to simply douse a mock scrape with buck and/or doe urine and hope that the scent will not evaporate or be washed away by rain before a dominant buck will have located the hunter's love trap. It is also impractical to continually "freshen up" the mock scrape by periodic application of the urine compounds; in as much as, each visit will also necessarily entail leaving human odors in the vicinity of the mock scrape which would be counterproductive. productive.

Obviously a need has arisen for a slow release liquid lure dispenser that may be positioned over a mock scrape and left for extended periods of time without replenishment. As of this date the only known commercial lure dispensers involve inverted receptacles having a straight gravity feed of the liquid contents of the receptacle; and, these devices were obviously developed for the sole purpose of promoting the consumption and increased sales of the urine suppliers, and did not take into consideration the limited financial resources of their customers.

BRIEF SUMMARY OF THE INVENTION

The present invention represents a vast improvement over the bottom opening gravity lure dispensers which are currently commercially available.

To begin with, the lure dispenser of this invention comprises a top delivery capillary feed apparatus that eliminates the following deficiencies in the prior art constructions: leakage of the receptacle contents through the primary receptacle closure element, positioning of the dispensing orifice and the venting orifice on opposite ends of the receptacle; gravity and atmosphereic forced feed of the receptacle contents; and, the necessity to undergo numerous manipulations to effect the refilling and repositioning of the refilled receptacle.

The present invention comprises in general a fluid receptacle having a fluid delivery means comprising a capillary feed tube, a receptacle closure means, and a vent passageway formed integrally with said receptacle closure means. In addition, the invention further comprises a receptacle holder element that serves as both a support and camouflage means for the fluid receptacle, as well as functioning as an optional capillary feed tube retaining element.

The instant invention was designed and developed to allow the fluid receptacle to be suspended from a branch in an upright position, with the outlet of the capillary feed tube depending below the bottom of fluid receptacle, whereby the flexible walls of the receptacle may be depressed to force the fluid into the capillary feed tube to initiate a very slow and metered depletion of the fluid contents of the receptacle onto the ground below.

By virtue of the foregoing arrangement, the hunter can quickly position the lure dispenser of this invention in the desired location, and then initiate a prolonged interval drop feed of the urine onto the mock scrape to continuously freshen the scrape for extended periods of time without the necessity of replenishing the receptacle contents.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein:

FIG. 1 is a perspective view of the apparatus of this invention employed in its intended environment;

FIG. 2 is a front elevation view of the lure dispenser and holder element;

FIG. 3 is a partial cross-sectional view of the fluid receptacle and delivery means;

FIG. 4 is an enlarged front detail view of the receptacle closure means; and,

FIG. 5 is an enlarged top detailed view of the receptacle closure means.

BEST MODE FOR CARRYING OUT THE INVENTION

As can best be seen by reference to FIG. 1, the lure dispenser apparatus of the present invention is designated generally by the reference numeral 10. The lure dispenser apparatus (10) comprises in general a fluid receptacle unit (11), a fluid delivery means (12) and a receptacle holder unit (13). These units will now be described in seriatim fashion.

As can be seen by reference to FIGS. 2 and 3, the fluid receptacle unit (11) comprises a collapsible wall receptacle member (14) having a threaded neck portion (15), wherein the receptacle member (14) forms a fluid reservior (16) for a liquid animal lure (17).

The fluid receptacle unit (11) is further provided with a fluid delivery means (12) comprising a receptacle closure means (18) and a capillary feed tube (25).

As best shown in FIGS. 3 and 4, the receptacle closure means (18) comprises a cap member (21) that threadedly engages the threaded neck portion (15) of the collapsible receptacle member (14). In addition, the receptacle closure means (18) also comprises a pivoted nozzle element (22).

As shown in FIG. 3, the fluid delivery means (12) comprises an elongated capillary feed tube (25), comprising a length of capillary tubing dimensioned to pass through the nozzle element opening (26) and position one end (25') of the tubing proximate the bottom of the fluid reservoir (16) while the other end (25") of the tubing is deployed beneath the fluid reservoir (16).

The fluid delivery means (12) is actuated by first tightening the receptacle closure means (18) to seal the interior of the receptacle member, and then depressing the walls of the collapsible receptacle member (14) to force the liquid animal lure (17) in the reservoir (16) through the capillary feed tube (25) at which point the closure means (18) is loosened to vent the interior of the receptacle member (14). When the outlet end (25") of the capillary tubing (25) is positioned beneath the reservoir (16) an intermittant drop feed of the liquid lure (17) will be initiated, and will continue until the liquid (17) is depleted.

As can best be seen by reference to FIG. 2, the receptacle holder unit (13) includes a generally cylindrical support member (26) comprising an expansible fabric element (27) that will comformably receive and support the receptacle member (14). In the preferred embodiment of this invention, the expansible fabric element (27) comprises a tubular length of dark colored plastic netting (28).

As thus far described, the interstices alone of the netting (28) will allow this invention to be deployed in its intended mode of operation. However, this invention further contemplates providing the upper portion of the expansible fabric element (27) with a pair of enlarged opposed voids (29) and at least one elongated vertical slit (30) extending from the top of the fabric element (27).

The voids (29) are provided to accept a length of string, or the like, (not shown) so that the receptacle member (14) and the support member (26) may be suspended from a suitable branch (1) overhanging a scrape (2), for the purpose of luring a whitetail buck into the vicinity of the apparatus (10).

As shown in FIG. 2, the vertical slit (30) is provided in the fabric element (27) to permit the external portion of the capillary feed tube (25) to be positioned beneath the point of connection between the apparatus (10) and the branch (1).

As mentioned earlier in the specification, the expansible fabric element (27) serves a variety of purposes and functions, in addition to its role as a receptacle holder unit (13). Most commercial deer lures are in plastic receptacles; wherein the color, or combination of colors of the receptacle clash or contrast with the earth tones or natural coloration of the environment in which the receptacle will be employed.

To this end the dark colored fabric element (27) covers and camouflages extensive portions of the enveloped receptacle member (14), as well as breaking up expanses of unnaturally colored receptacles. In addition the interstices of the netting (28) will frictionally accept passage of the capillary tubing (25) for the purpose of releasably securing the outlet end (25") of the tubing beneath the fluid reservoir (16).

It should also be appreciated at this junction that the capillary action of the capillary tubing (25) may be produced either by a tube having a very small bore, or a tube containing a capillary wick element, in accordance with well-recognized principles.

Having thereby disclosed the subject matter of this invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A buck lure dispensing apparatus adapted to be suspended by a length of string from a branch of a tree; wherein, the buck lure dispensing apparatus comprises:
   a collapsible receptacle member forming a fluid reservoir;
   a closure means operatively connected to the top of the receptacle member and comprising a cap member having a nozzle element;
   a capillary feed tube extending from the fluid reservoir to a location beneath the fluid reservoir; wherein, said capillary feed tube extends through the nozzle element in said cap member, and,
   a reseptacle holder unit for suspending the receptacle member in an upright position beneath said tree branch; wherein, said reseptacle holder unit comprises:
   a generally cylindrical support member comprising an expansible fabric element.

2. An apparatus as in claim 1, wherein, said expansible fabric element comprises:
   a tubular length of netting.

3. An apparatus as in claim 1; wherein, said expansible fabric element comprises:
   dark colored plastic netting.

4. An apparatus as in claim 1; wherein, said generally cylindrical support member is conformable to said receptacle member.

5. An apparatus as in claim 1; wherein the upper portion of said expansible fabric element is provided with a pair of enlarged opposed voids.

6. An apparatus as in claim 5; wherein, the upper portion of said expansible fabric element is further provided with at least one elongated vertical slit.

7. An apparatus as in claim 2; wherein, the interstices in said netting are dimensioned to receive said capillary feed tube.

* * * * *